June 26, 1962 R. F. SIMONIN ET AL 3,041,181
DYNAMIC METHOD OF LIQUID-PHASE AEROBIC FERMENTATIONS AND
PRODUCTS OBTAINED THEREFROM
Filed Nov. 10, 1955 5 Sheets-Sheet 1

3,041,181
Patented June 26, 1962

1

3,041,181
DYNAMIC METHOD OF LIQUID-PHASE AEROBIC FERMENTATIONS AND PRODUCTS OBTAINED THEREFROM
Raymond F. Simonin, 4 Rue du Docteur Durande, and Maurice Bernard, La Boudronnee, both of Dijon, France
Filed Nov. 10, 1955, Ser. No. 546,246
Claims priority, application France Nov. 16, 1954
8 Claims. (Cl. 99—147)

This invention relates to the treatment of aerobic fermentable liquids and its chief object is to provide a method of treating these aerobic fermentable liquids, as well as means for carrying out this method; on the other hand, this invention is concerned with the products resulting from this treatment.

The term "fermentable liquids" designates herein a liquid having dispersed naturally therein aerobic microorganisms adapted to cause this liquid to fermentate, or a liquid in which these microorganisms have been dispersed purposely or artificially to form a suspension therein.

It is the essential object of this method to convert a fermentable liquid, through the action resulting from the microorganisms contained therein, into another, chemically different liquid, like the re-arrangement of alcohol into acetic acid, of a saccharose into citric acid, etc.; another object of this invention consists in collecting microorganisms constituting real living substances like yeast or Penicillium, as utilized in the preparation of penicillin or other products. This treatment may be effected in one or more successive steps, according to the batch or continuous operation.

Since the works of Pasteur, it is well known that the development of aerobic microorganisms as well as their action in the chemical re-arrangement takes place at the liquid-air interface. Therefore, the methods employed for the aerobic fermentation are directed to increase the interface contact area between the liquid and air media. The most widely known process of this type is the method of producing vinegar, in which the liquid to be fermented is sowed over a support offering a relatively wide air-contacting surface, for example beech shavings. The liquid is allowed to stream on the shavings and at the same time an air circulation is created which licks the streaming surface, thereby producing a more or less active microbic fermentation. Other fermentation methods are known which consist in causing an oxidizing gas to bubble through the fermentable liquid containing wide-area supports previously sowed with bacteria.

The invention described hereinafter is based on a dynamic method of increasing the area of the interface between a liquid and a gas, which was described in a report written by Raymond F. Simonin and read by Henri Villat at the Académie des Sciences of Paris in its sitting of August 6, 1951, entitled "The Operation of the Water-Jet Pump," and published in "Recueils des Comptes-Rendus de l'Académie des Sciences de Paris, 1951, 2 ème Semestre, Tome 233, pp. 465–466."

The aerobic fermentation method according to this invention consists in increasing up to a desired and predetermined value the area of the interface between a fermentable liquid contained in a vat and a gaseous phase, by using the kinetic energy developed by jets of said liquid issuing from pressure nozzles and impinging in the fermentable liquid mass through the gaseous phase whilst constantly converting said interface into a wide-curvature dynamically-balanced interface forming with the lateral surface of the jets a large number of cavities open to the gaseous phase which are resolved periodically into closed spherical cavities or bubbles urged by the hydrostatic thrust to the general level of the liquid.

The jet-forming nozzles may be disposed outside the fermentable liquid mass and comprise one or more orifices adapted to produce one or more liquid jets directed obliquely or at right angles to the general level.

The nozzles may also be immersed in the fermentable liquid, the jets issuing therefrom leading into a chamber connected to the atmosphere through a duct and provided with an ejector orifice.

In this case the wide-curvature interfaces resolving into bubbles are formed within the liquid mass itself.

A jet may be caused to strike the liquid mass in all the directions of a single plane by producing this jet in the form of the mutual impingement of two similar, coaxial and oppositely-directed liquid streams.

The atmosphere in which the impact takes place may have a pressure value lower or higher than, or equal to, the atmospheric value.

The area of the liquid-air interface in the liquid volume unit, to which the activity and rate of growth of the microorganisms is constantly subordinate, is proportional to the area of the interface of a bubble and to the number of bubbles co-existing therein at the moment considered. This number of bubbles depends on the area of the lateral surface of the jets streaming through the gaseous phase at the impact, on the velocity of movement of these surfaces and on the duration of the bubbles within the liquid mass.

The greater the excess pressure in a bubble, the greater the intensity of the activity and rate of growth of the microorganisms operating on the surface of the bubble; in other words, this intensity increases as the surface tension of the fermentable liquid increases and the bubble radius decreases.

The area of the interface is maintained to the desired value by constantly re-forming the same open cavities resolving continuously into bubbles to replace those escaping from the fermentable liquid. This provides a regular supply of the oxygen required for the constant activity of the microorganisms, this supply taking place in the form most consistent with this activity. This result is obtained by creating a permanent rate of flow of the liquid jets.

The time during which a bubble remains within the liquid, which is the actual life of the bubble, conditions the proportion of bubble oxygen which is used by the microorganisms for the chemical rearrangement.

The swarm of bubbles moving within the mass of fermentable liquid forms a gaseous emulsion in a continuous liquid phase. The rate of flow of this emulsion may be either free or properly directed or controlled; in this last case, if necessary, the momentary area of the interface may be increased by incrementing the duration of the bubbles.

A controlled rate of flow of the gaseous emulsion may be obtained for example by causing the jets to impinge through tubes connected to the gaseous phase and immersed in the fermentable liquid, these tubes having their inlets directed in the direction of the aforesaid jets and their other ends adapted to eject the emulsion at the proper place and in the desired direction.

Thus, the bubbles may also be channeled under a dome-shaped wall immersed in the liquid or emerging from the general level where the bubble contents are under a pressure higher than the atmospheric pressure and from which they escape for the possible recovery of their useful products.

The optimum temperature for fermentation purposes is made homogeneous by the bubbling of the liquid and adjusted by a heat-exchanger of any suitable and known type, automatically or not.

When the fermentation is completed one portion of the fermented liquid is extracted from the vat to make room for fresh liquid to be fermented, so that the mixture is ready for starting another cycle of fermentation.

Thus, a batch process is obtained.

However, it is also possible to carry out the aerobic fermentation method of this invention as a continuous process. To this end, a plurality of jet-forming nozzles disposed in cascade may be used, the pressure of the fermentable liquid being restored by adequate devices, there being as many such devices as nozzles in the installation. The number of nozzles and of pressure-restoring devices is such that the microorganisms receive the quantity of oxygen required for producing the fermentation between the liquid emission from the first and that from the last nozzles.

It is another object of this invention to provide chemical re-arrangement products obtained by carrying out the method broadly set forth hereinabove, which are suitable for use as commercial, industrial and/or food products.

The attached drawings forming part of this specification illustrate diagrammatically by way of example a few forms of embodiment of the invention; in the drawings, wherein the same reference characters designate the same component elements:

Figure 1:
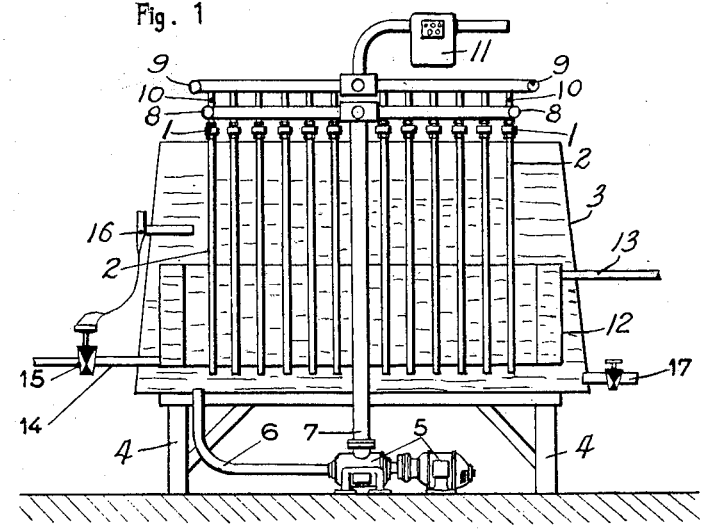
FIGURE 1 is a diagrammatical view showing in vertical section a multi-jet fermentation apparatus.

The multi-jet apparatus illustrated in FIG. 1 comprises chambers 1 provided with coaxial dipper tubes 2 in which the jets of fermentable liquid contained in the vat 3 are directed. This vat is supported by a frame 4 bearing on the floor. The fermentable liquid is adapted to be pressurized by a centrifugal-pump and motor set 5 connected to a suction pipe 6 and a delivery pipe 7 feeding an annular distributor 8 connected in turn to the nozzles producing the jets issuing into the chambers 1. These chambers 1 are connected through pipes 10 to an annular air manifold 9; preferably, these pipes 10 are flexible, and the manifold 9 is connected in turn to an air meter 11 for checking the proportion of oxygen dispersed in emulsion form in the liquid contained in the vat 3. A heat exchanger 12 of annular shape is disposed concentrically in the vat 3 and adapted to be supplied with water heated to the desired temperature for heating or cooling the fermentable liquid; the heating or cooling medium is supplied to the heat-exchanger 12 through an inlet pipe 13 and discharged therefrom through an outlet pipe 14. A valve 15 of any known and suitable type is provided for regulating the water output; it may be controlled either manually or automatically through a thermostat 16 for adjusting the temperature of the fermentable liquid to the desired value. A gate valve 17 is also provided for taking the fermented liquid and leaving if necessary in the vat a fraction sufficient for sowing the liquid to be fermented during the subsequent cycle.

Figure 2:
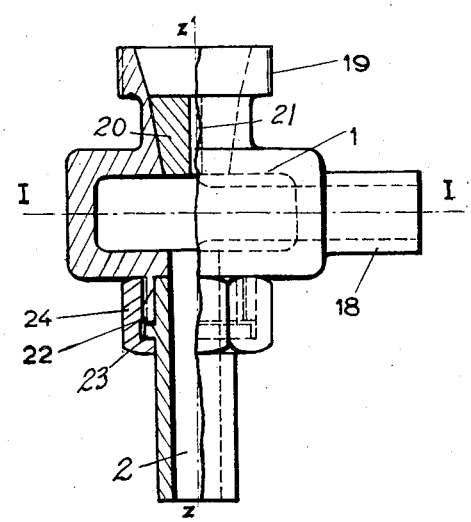
FIGURE 2 is a part-sectional, part-elevational view showing a single-orifice nozzle with tangential air-inlet chamber and dipper tube.
Figure 3:
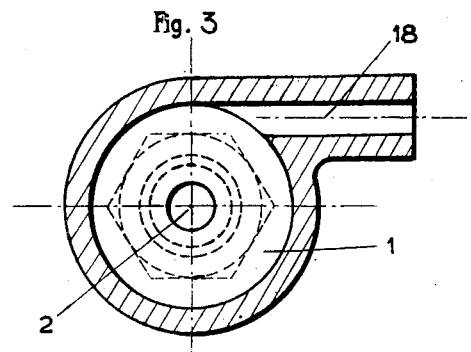
FIGURE 3 is a section taken upon the line I—I of FIG. 2.

In the apparatus just described vertical pressure-liquid jets are used which are fed to the chambers 1, of which a preferred embodiment is illustrated in FIGS. 2 and 3.

This chamber 1 is a straight cylindrical hollow body having a circular base, an axis Z'Z and a tangential air inlet 18 connected to the circular air manifold 9 through a flexible pipe 10 (not shown). The upper portion of the hollow body 1 is provided with a screw-threaded collar portion 19 constituting one of the three arms of a union of known type, the other two arms of the union being formed integrally on the pressure-liquid distributor 8. The upper portion of chamber 1 is machined internally to form a female cone adapted to receive a male nozzle member 20 of same taper; a calibrated hole 21 for producing a pressure-liquid jet is formed centrally of this member 20. The lower portion 22 of the hollow body 1 is also machined internally to form a cylinder adapted to receive a dipper pipe 2 concentrical with the axis Z'Z and bearing on the base 22 through a shoulder or collar 23 rigid with the dipper pipe 2 and adapted to be clamped in position by screwing the nut 24 on the corresponding screw-threaded end of the lower portion 22 of the hollow body 1, as shown.

Figure 4:
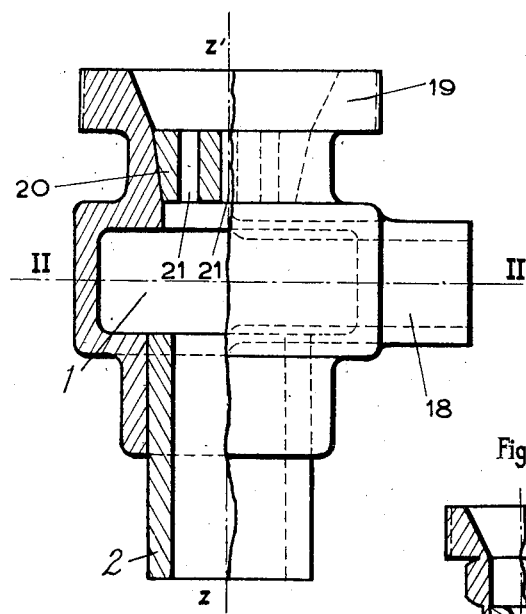
FIGURE 4 is a view similar to FIG. 2 showing a multi-orifice nozzle also provided with a tangential air-inlet chamber and a dipper tube.
Figure 5:
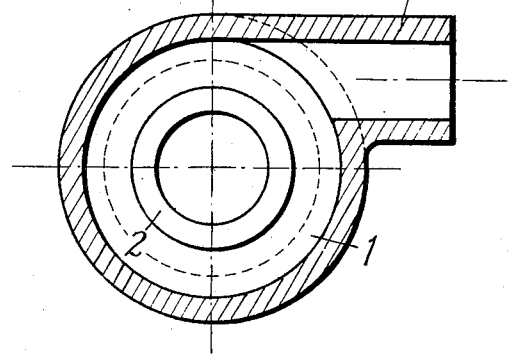
FIGURE 5 is a section taken upon the line II—II of FIG. 4.

The modified chamber 1 illustrated in FIGS. 4 and 5 consists of a hollow body of cylindrical form having a circular base and a tangential air inlet 18. The upper portion of this chamber 1 is formed with a screw-threaded collar 19 whereby the device may be connected to the pressure-liquid distributor. The tapered nozzle 20 force-fitted for this purpose in the upper portion of the chamber machine has a plurality of calibrated orifices 21 drilled therethrough for producing as many jets parallel to the axis Z'Z and directed towards the dipper pipe 2 rigid with the lower portion of the chamber 1.

Figure 6:
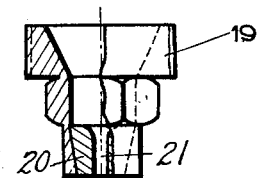
FIGURE 6 is a part-sectional, part-elevational view showing a single-jet nozzle adapted to form a cylindrical jet through an orifice having a rounded inlet edge.

FIGURE 6 illustrates another form of embodiment of the apparatus for carrying out the method of this invention which is particularly simple and consists in substituting, in the fermentation apparatus of FIG. 1, a single-jet nozzle 21 (FIG. 6) for the chamber 1 of FIGS. 2 and 3, 4 and 5, on the one hand, and for the dipper pipes 2, on the other hand. This simplified nozzle comprises a screw-threaded collar 19 constituting the third arm of a three-arm union and having machined therein a female cone adapted to receive a male cone 20 in which a calibrated hole 21 with rounded inlet edge is drilled, as shown. This replacement is effected by engaging the connecting nut (not shown) on the pressure-liquid distributor 8. In this embodiment of the invention the jets issuing from the calibrated orifices such as 21 impinge directly on the liquid at the general level thereof in the vat 3. In this case, the air manifold 9 and flexible air pipe 10 may be dispensed with, together with the device 11 for metering the absorbed air.

Figure 7:
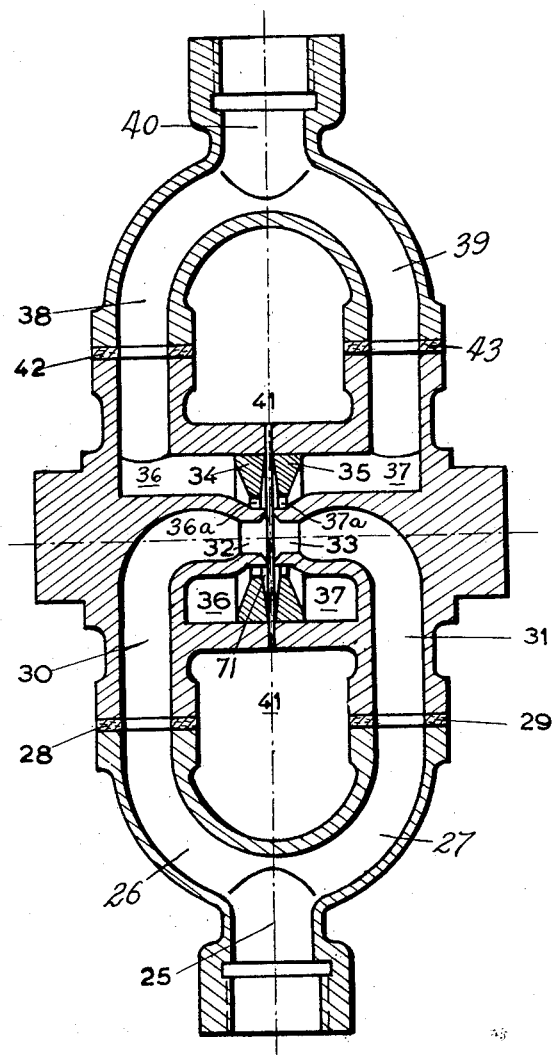
FIGURE 7 is a longitudinal section showing a radial-jet device operating submerged and provided with a symmetrical air inlet.

The apparatus illustrated in FIG. 7 operates with a radial jet forming a thin axifugal sheet resulting from the mutual impingement of two coaxial jets of opposite directions. These jets are produced by delivering the fermentable liquid under pressure through an inlet duct 25 leading into two symmetrical branch ducts 26, 27 directing the liquid across sealing gaskets 28, 29 to another pair of symmetrical branch ducts 30, 31 ending with a pair of coaxial orifices 32, 33 facing each other, as shown. As the two jets issuing through these orifices impinge against each other they form a thin, plane or hyperbolic sheet of liquid escaping into an annular space 71 provided between a pair of closely spaced rings 34, 35 coaxial with the orifices 32, 33 and of substantially trapezoidal radial cross-section. The radial liquid sheet thus produced is delivered through the annular passages 36a and 37a to the chamber consisting of the annular spaces 36, 37 communicating with the two branches 38, 39 of the air-inlet duct 40. The liquid sheet and the bubbles engendered thereby due to the increment in the liquid-air interface which results from the considerable kinetic energy of the radial jet in the annular spaces 36, 37 escape freely through the annular space 71 and the annular chamber 41 in the fermentable liquid in which the device is immersed. The device is sealed by gaskets 42, 43, in addition to the aforesaid gaskets 28, 29, and these gaskets may be clamped by screws, bolts or other adequate means (not shown).

The air inlet duct 40 has fitted thereon a pipe (not shown) connected to the atmosphere or to another source of air under pressure higher or lower than the atmospheric value.

Figure 8:
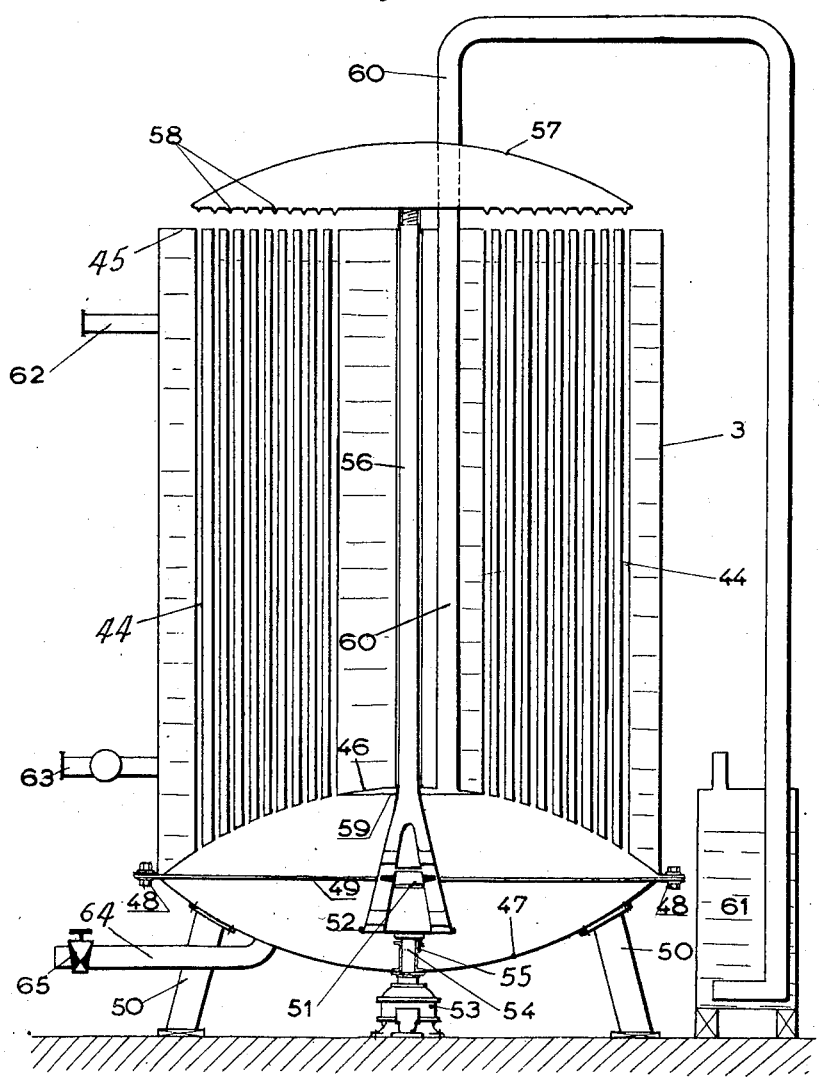
FIGURE 8 is a diagrammatical section taken upon a vertical plane and showing a fermentation apparatus with means for recovering the useful volatile products.

The aerobic fermentation apparatus illustrated in FIG. 8 is designed for permitting the recovery of the useful volatile substances; the cylindrical vat 3 has mounted therein a cluster assembly consisting of a relatively great number of tubes 44 disposed vertically and secured in fluid-tight fashion on a flat top plate 45, on the one hand, and on a dome-shaped bottom plate 46. The cylindrical wall 3 is assembled with a cup-shaped bottom 47 by means of bolts 48 and a sealing gasket 49. The assembly bears on the ground through the medium of props 50. A propeller rotor 51 is mounted coaxially in the centre of the cylindrical wall 3 of the vat and in a stator 52, as shown; this rotor is driven from a motor 53 through a shaft 54 extending through a suitable gland packing 55. The stator 52 and rotor 51 constitute an axial-flow (propeller-type) impeller pump immersed in the fermentable liquid filling the tubes of the aforesaid cluster as well as the lenticular space formed between the dome-shaped bottom 46 and the cup-shaped bottom 47. The liquid is brought to a predetermined pressure by the impeller pump and driven through a duct 56 across a nozzle 57 formed with calibrated orifices 58 producing jets issuing in turn directly in all the tubes 44 of the cluster. The rate of flow of the gaseous emulsion resulting from the jet impingement is directed downwards. The mixture escaping from the liquid at the level 59 thereof collects at the top of the dome-shaped bottom plate 46 and is subsequently directed through a duct 60 towards a washing apparatus 61 from which the useful substances are recovered. The fermentation temperature is adjusted by causing water to circulate between the tubes of the cluster, this water being admitted at 62 and issuing from the apparatus at 63. The fermented liquid is collected by means of a pipe 64 equipped with a valve 65.

Figure 9:
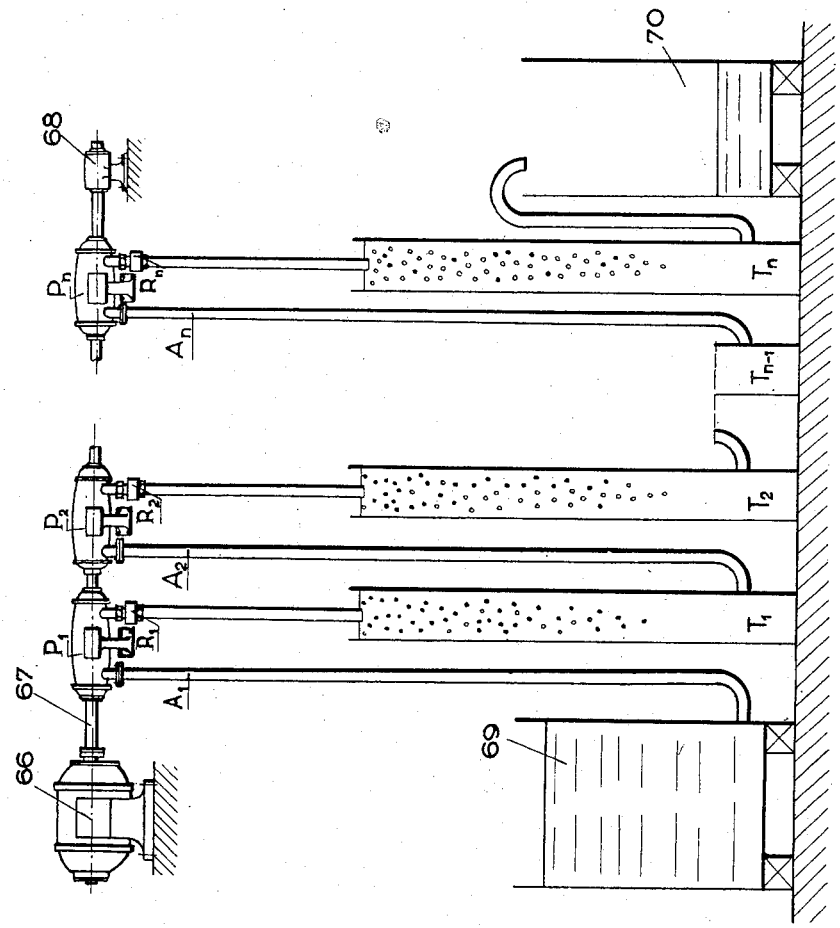
FIGURE 9 is a diagrammatical view showing an apparatus for carrying out a continuous fermentation process.

The installation for the continuous aerobic fermentation which is illustrated in FIG. 9 is so designed that the degree of fermentation of the liquid increases from the first jet to the last jet. To this end, a motor 66 is adapted to drive a shaft 67 supported by a bearing 68 and adapted to transmit the motor power to a set of pumps $P_1, P_2 \ldots P_n$ all of the same type and providing the same output.

The first pump $P_1$ draws the fermentable liquid from a constantly supplied vat 69 through a pipe $A_1$ and delivers this liquid under the proper pressure across a nozzle $R_1$ provided with calibrated orifices forming as many jets directed into a tube $T_1$ filled with liquid. The base of this tube $T_1$ is connected to the next pump $P_2$ through a suction pipe $A_2$ and this pump delivers the liquid through another nozzle $R_2$ provided with the same orifices as the preceding nozzle and adapted to direct liquid jets impinging in the underlying tube $T_2$ connected in turn to the next pump $P_3$ through a suction pipe $A_3$, and so forth until the liquid is drawn by suction by the last pump $P_n$ from the preceding tube $T_{n-1}$ so as to be delivered in the form of pressurized jets across the nozzle $R_n$ into the last tube $T_n$, the fermented liquid released from this tube being delivered into a vat 70 and collected therein.

The number $n$ of pumps of the cascade arrangement described hereinabove is such that the output of fermentable liquid will receive the quantity of oxygen required to enable the activity of the microorganisms to effect the desired chemical re-arrangement, during the period in which this output flows through the complete set of pumps of the cascade, until it is collected in the storage vat 70.

The devices and apparatus described hereinabove by way of example may be utilized either separately or in combination to constitute an equipment suitable for the desired specific aerobic fermentation process. The materials employed in their construction are selected with due regard to their resistance to the chemical substances used and to the possible heat-sterilization requirements.

Also by way of example reference may be had to a specific application of the method of this invention, such as the production of wine vinegar. In this application the apparatus may be constructed of wood, stainless steel, plastics, but any copper-containing materials should be avoided as well as any other material likely to be attacked by the acetic acid.

The vat is filled with wine in which the desired amount of bacteria are dispersed, the fermentation temperature being kept at this time within the range of from 32 to 35° C., this value being maintained from the beginning of the cycle by properly adjusting the heat exchanger.

The acetification takes place easily within 24 hours.

The yield of this fermentation, i.e. the ratio of the final quantity of acetic acid to the quantity of alcohol employed initially, is as high as 92%, whereas in the latest fermentation processes this yield does not exceed 85%. On the other hand, the energy consumption required for increasing the area of the interface per barrel of vinegar produced is lower than the specific energy absorbed in the most recent industrial processes.

What we claim is:

1. A dynamic method of effecting an aerobic liquid-phase fermentation, consisting in utilizing the kinetic energy of jets under pressure of fermentable liquid through an oxidising air phase in contact with the fermentable liquid so as to increase the area of the interface between the liquid phase and the air phase, by converting this interface into a wide-curvature surface forming with the lateral surface of said jets cavities open to the air phase and closing periodically to create bubbles forming an air emulsion in continuous liquid phase and continuously withdrawing a portion of the said fermentable liquid, to reproject it in the form of said jets under pressure into said liquid.

2. A method according to claim 1, wherein the area of said interface which conditions the growth and chemical work of the microorganisms dispersed in the liquid is constantly kept to the desired value by properly selecting the number of jets and adjusting the duration of a bubble in the fermentable liquid.

3. A method according to claim 2, wherein the duration of said bubbles is adjusted by directing the rate of flow of said gaseous emulsion within said liquid.

4. A method according to claim 2, wherein the content of the excess bubbles is recovered.

5. A method according to claim 2, wherein a series of identical aerobic fermentation steps are carried out in cascade.

6. A method according to claim 1, wherein jets under pressure are introduced through one or several points above the surface of the fermentable liquid.

7. A method according to claim 6, wherein the jets under pressure introduced into the fermentable liquid are dispersed therein in parallel streams.

8. A method of manufacturing vinegar from wine which consists in utilizing the kinetic energy of jets under pressure of fermenting wine through an oxidising air phase in contact with the fermenting wine, so as to increase the area of the interface between the fermenting wine phase and the air phase by converting this interface into a wide-curvature surface forming with the lateral surface of said jets cavities open to the air phase and closing periodically to create bubbles forming an air emulsion in continuous fermenting wine phase and continuously withdrawing a portion of the said fermenting wine to reproject it in the form of said jets under pressure into said fermenting wine.

References Cited in the file of this patent

UNITED STATES PATENTS

| | | |
|---|---|---|
| 1,808,956 | Ketterer | June 9, 1931 |
| 1,880,381 | Frings | Oct. 4, 1932 |
| 2,020,850 | Myhren et al. | Nov. 12, 1935 |
| 2,121,533 | Wells et al. | June 21, 1938 |
| 2,207,768 | Weijlard et al. | July 16, 1940 |
| 2,244,902 | Stich | June 10, 1941 |
| 2,261,830 | Ditner | Nov. 4, 1941 |
| 2,298,561 | Hendrickson | Oct. 13, 1942 |
| 2,413,102 | Ebert et al. | Dec. 24, 1946 |
| 2,423,897 | Mackin | July 15, 1947 |
| 2,707,683 | Hromatka et al. | May 3, 1955 |
| 2,913,343 | Richardson | Nov. 17, 1959 |